(12) United States Patent
Burleson et al.

(10) Patent No.: US 12,172,568 B2
(45) Date of Patent: Dec. 24, 2024

(54) STRAP TEAR DETECTION

(71) Applicant: J.J. Keller & Associates, Inc., Neenah, WI (US)

(72) Inventors: Benjamin Luke Burleson, City College Station, TX (US); Paul Edward Paulick, Oshkosh, WI (US); Jason Jon Kreidler, Sheboygan, WI (US)

(73) Assignee: J.J. Keller & Associates, Inc., Neenah, WI (US)

( * ) Notice: Subject to any disclaimer, the term of this patent is extended or adjusted under 35 U.S.C. 154(b) by 77 days.

(21) Appl. No.: 18/115,984

(22) Filed: Mar. 1, 2023

(65) Prior Publication Data

US 2024/0294107 A1    Sep. 5, 2024

(51) Int. Cl.
*B60P 7/08*    (2006.01)

(52) U.S. Cl.
CPC .................................. *B60P 7/0861* (2013.01)

(58) Field of Classification Search
CPC .................................................... B60P 7/0861
See application file for complete search history.

(56) References Cited

U.S. PATENT DOCUMENTS

| | | | |
|---|---|---|---|
| 4,639,825 A * | 1/1987 | Breidegam | A61N 1/14 361/220 |
| 4,769,875 A | 9/1988 | Hartman | |
| 5,510,768 A * | 4/1996 | Mann | A45C 13/30 190/119 |
| 5,936,529 A * | 8/1999 | Reisman | G08B 21/22 340/8.1 |
| 6,176,066 B1 * | 1/2001 | Ong | H01L 21/67333 53/399 |
| 6,273,654 B1 | 8/2001 | Whitaker | |
| 9,581,972 B1 * | 2/2017 | Arrow | G04G 21/00 |
| 10,037,682 B1 * | 7/2018 | Shah | G08B 21/0272 |
| 10,337,212 B2 | 7/2019 | Barron | |
| 11,465,550 B1 | 10/2022 | Dooley | |
| 2008/0216561 A1 * | 9/2008 | Cooper | A61B 5/681 73/53.01 |
| 2010/0001856 A1 * | 1/2010 | Bender | G06Q 10/00 340/539.11 |
| 2016/0223992 A1 * | 8/2016 | Seo | G04G 19/00 |
| 2016/0287103 A1 * | 10/2016 | Saponas | A61B 5/681 |
| 2019/0257008 A1 | 8/2019 | Little et al. | |

FOREIGN PATENT DOCUMENTS

| | | |
|---|---|---|
| CA | 2274284 A1 | 12/1999 |
| DE | 20311093 U1 | 10/2003 |
| EP | 102933 A1 | 3/1984 |
| EP | 1585650 B1 | 12/2009 |
| WO | 2016034641 A1 | 3/2016 |

* cited by examiner

*Primary Examiner* — Thomas D Alunkal
(74) *Attorney, Agent, or Firm* — Wong Meyer Smith & McConnell

(57) ABSTRACT

A strap detection system for detecting if strap such as a load securing strap is torn or in need of replacement. The system includes an electric device on the strap in communication with a detection module.

16 Claims, 7 Drawing Sheets

STRAP TEAR DETECTION

FIELD OF THE INVENTION

The invention relates to an apparatus and a method for detecting a tear on a strap, and more particularly, for electronically detecting a tear on a load securing strap.

BACKGROUND OF THE INVENTION

Straps such as load securing straps are used routinely to tie down and secure loads such as on flatbed trucks, rail car, ships, other modes of transportation and such as on other surfaces like pallets, shelves and the like. The straps have a useful lifespan. When they tear or wear out, they become less effective, are unsafe and necessitate replacement. The Federal Motor Carrier Safety Administration (FMCSA) outlines that if a load securing strap has a cut that extends in on the strap more than 24% from the edge, it should be replaced.

Load securing straps should be inspected upon the beginning of each use to ensure that they are functioning properly and that loads are secure. This inspection, if done, is done visually and may not include all of the load securing straps or all surfaces of each load securing strap. This inspection time represents a significant time commitment for a user such as a driver who likely gets paid for miles driven and not for other necessary tasks like performing inspections and checking equipment.

To save time, many users often choose not to inspect the load securing straps as frequently or as thoroughly as necessary, which is a safety concern, or users may elect to replace the straps before their useful life has elapsed, causing undue cost to the companies who must purchase these straps. Accordingly, there is a need to make it easier and quicker for a user to determine when load securing straps have exceeded their useful life which will avoid load securement hazards from overworn straps and will avoid the unnecessary cost and waste from straps discarded before they are sufficiently worn.

SUMMARY OF THE INVENTION

In one construction, the disclosure provides strap detection system comprising an electric device positionable on a strap and a detection module in communication with the electric device, the detection module including an indicator operatable when the strap is torn.

In another construction, the disclosure provides a strap detection system comprising a conductive pathway fastenable to a strap and a detection module in communication with the electric circuit for determining when the strap is in need of replacement by detecting when the electric pathway has been interrupted.

In another construction, the disclosure provides a load securing strap detection assembly comprising a load securing strap having two edges and having a conductive pathway running adjacent each edge and a detection module in communication with the conductive pathway and supplying the conductive pathway with current, the detection module having a first indicator operable when current is flowing throughout the entire pathway and a second indicator operable when current is interrupted in the conductive pathway.

In another construction, the disclosure provides a method for detecting if a load securing strap needs to be replaced comprising the steps of providing a load securing strap to be tested, supplying a detection module, electrically connecting the detection module to a load securing strap and activating an indicator if the strap is in need of replacing.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
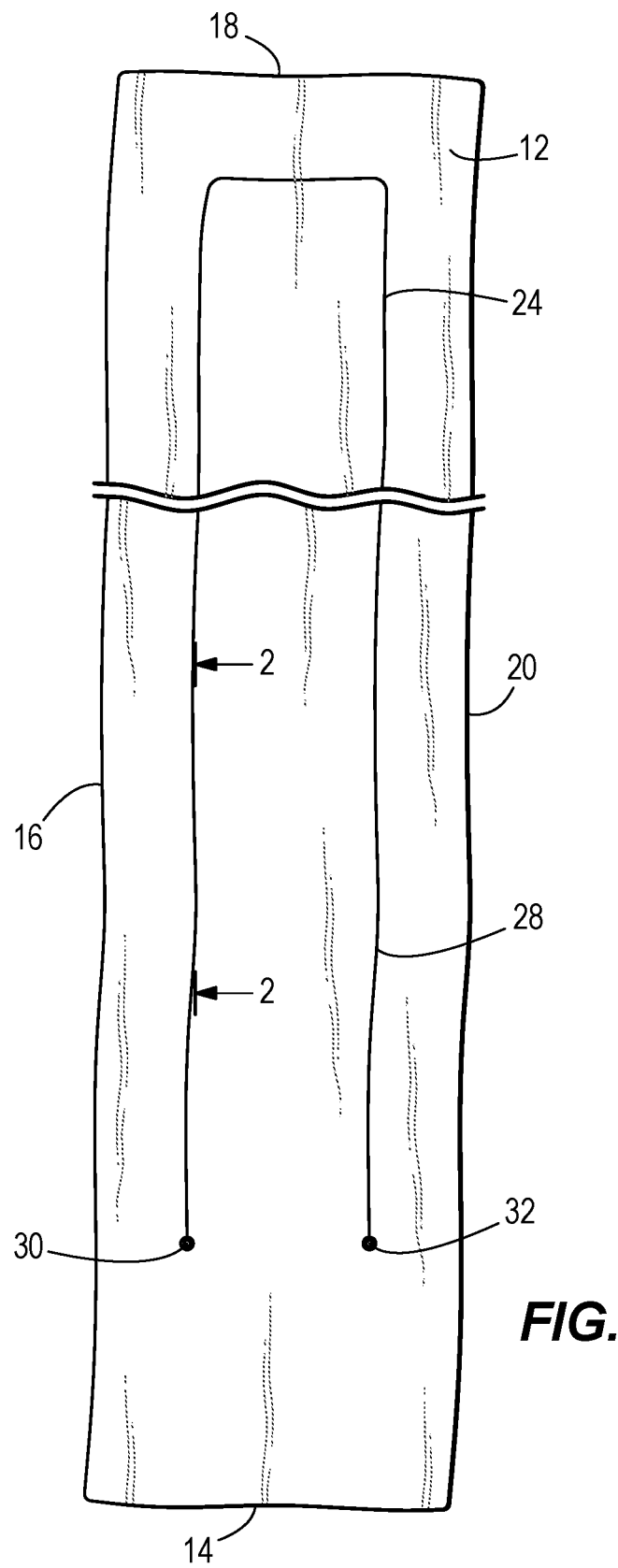
FIG. 1 is a top view of a portion of a load securing strap according to the invention.

FIG. 1 illustrates a strap 12 to be tested such as a load securing strap. Load securing straps are known in the art and are typically fabricate of a woven material such as polyester webbing or fabricated from nylon. The use of such straps 12 to secure a load is known in the art and therefore not shown in the drawings. Typically, a strap 12 has a first edge 14, a second edge 16, a third edge 18 and a fourth edge 20, however, other configurations can also be used.

Figure 2:
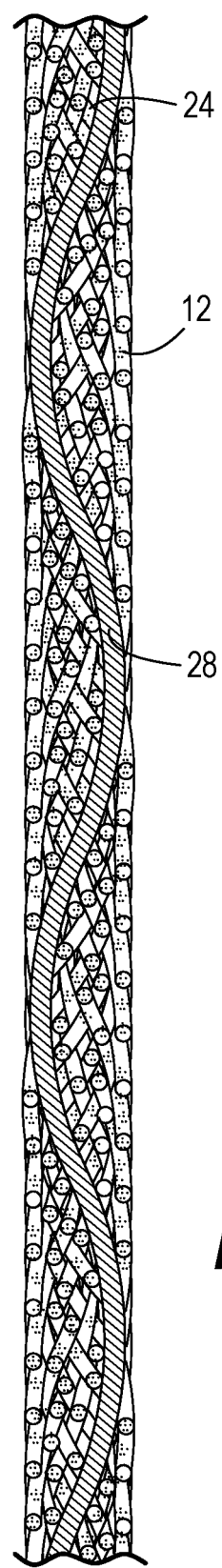
FIG. 2 is a cross sectional view along lines 2-2 of FIG. 1.
Figure 3:
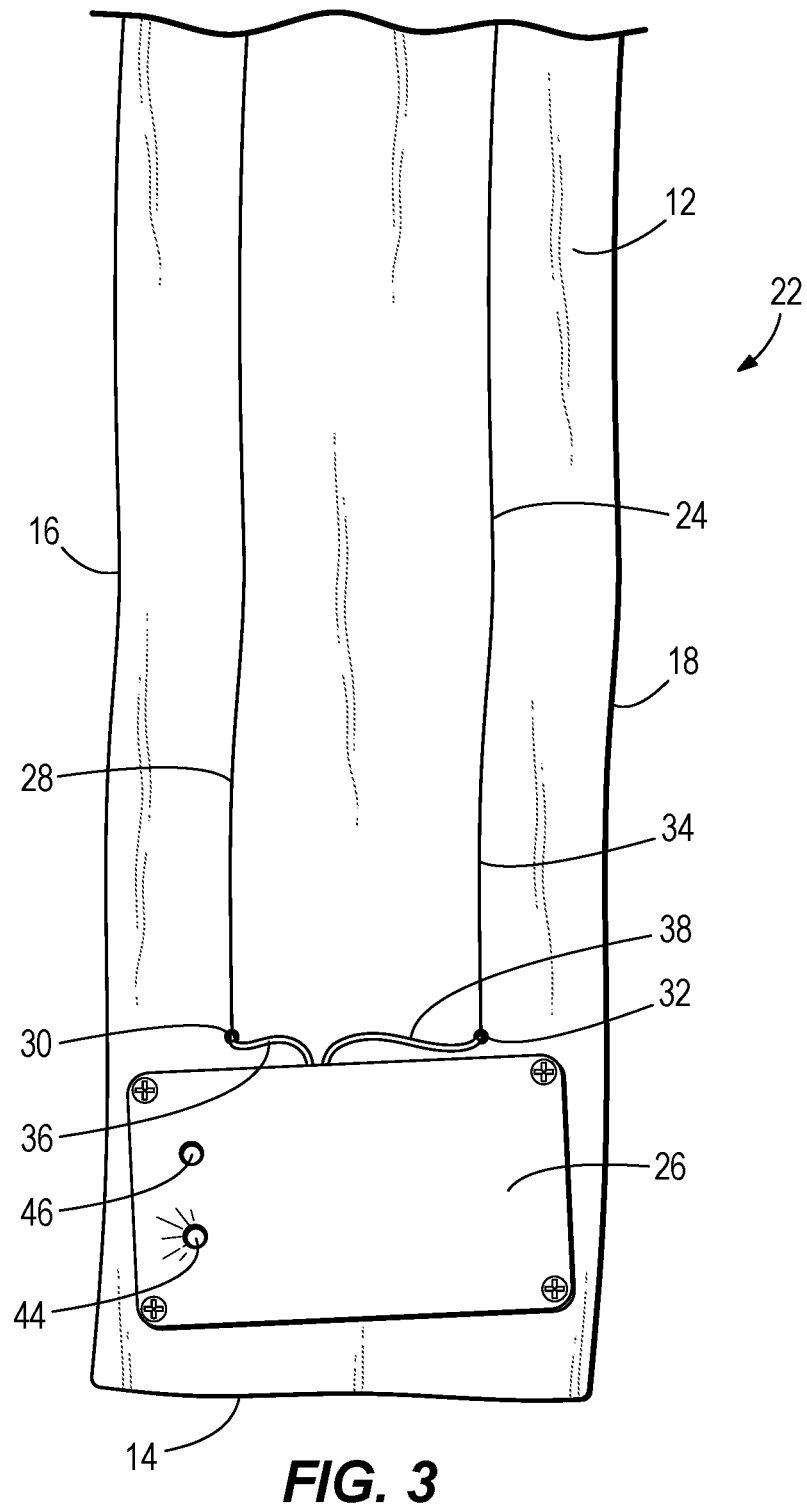
FIG. 3 is a top view of the load securing strap and a detection module.
Figure 4:
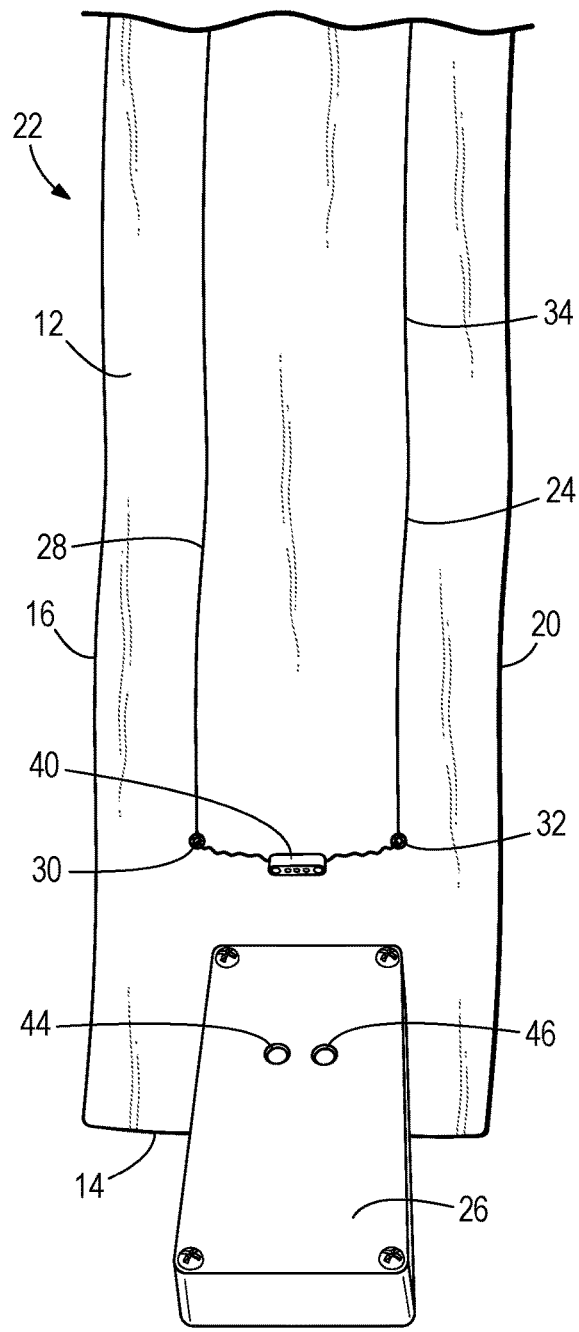
FIG. 4 is a perspective view of the load securing strap and a second embodiment of the detection module in an unplugged orientation.
Figure 5:
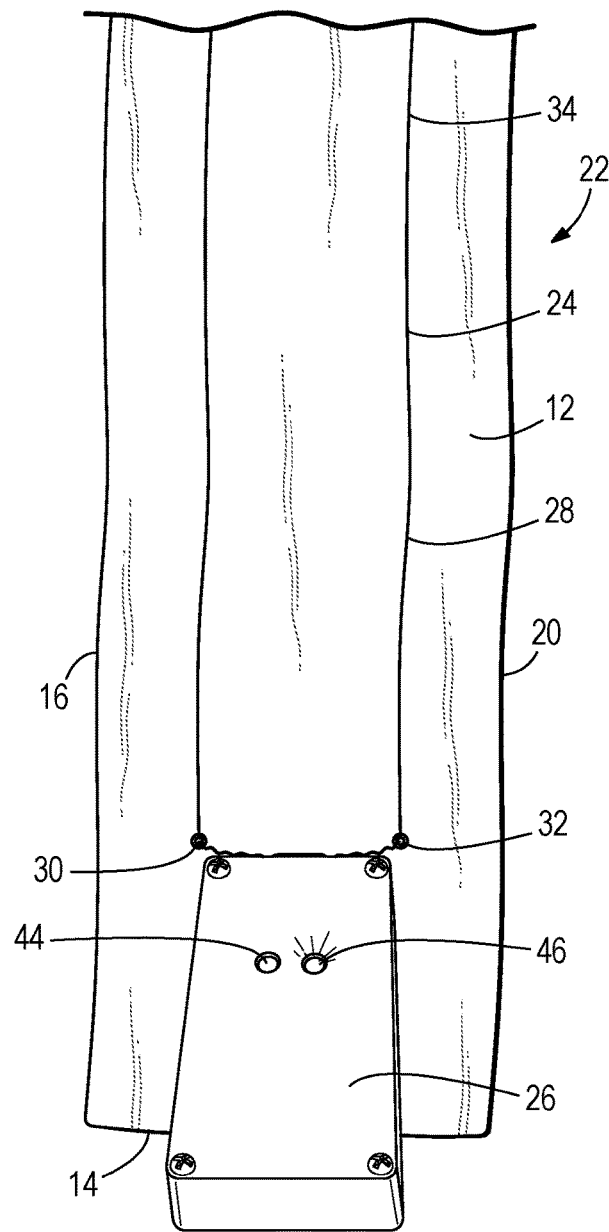
FIG. 5 is a perspective view of the load securing strap and the second embodiment of the detection module in a plugged orientation.
Figure 6:
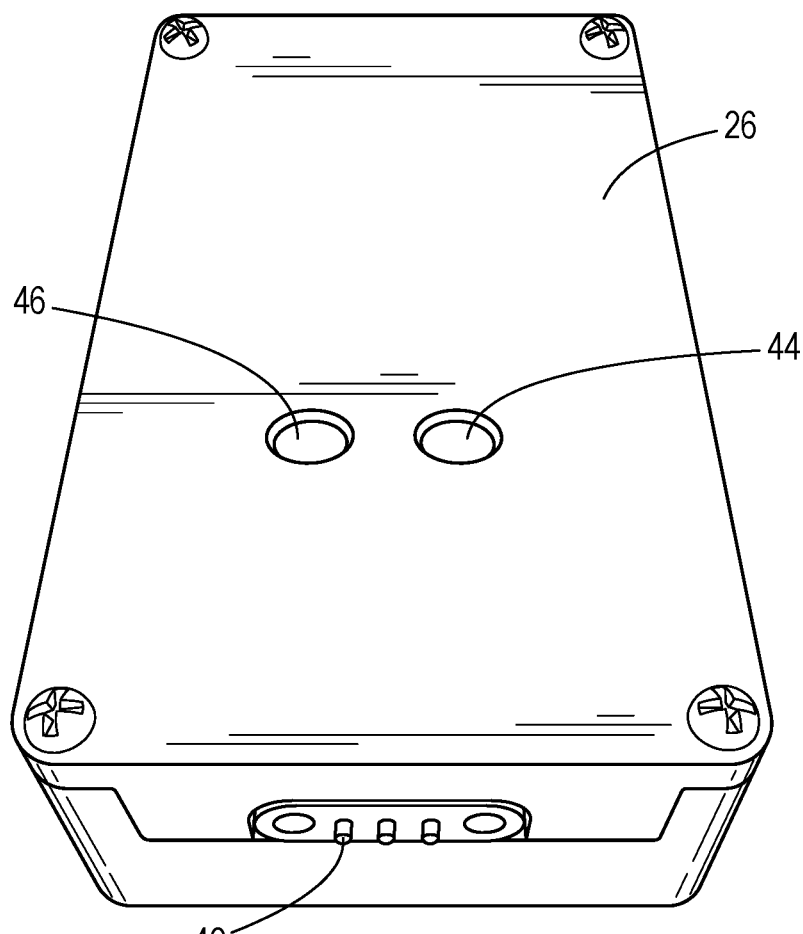
FIG. 6 is a perspective view of the second embodiment of the detection module.
Figure 7:
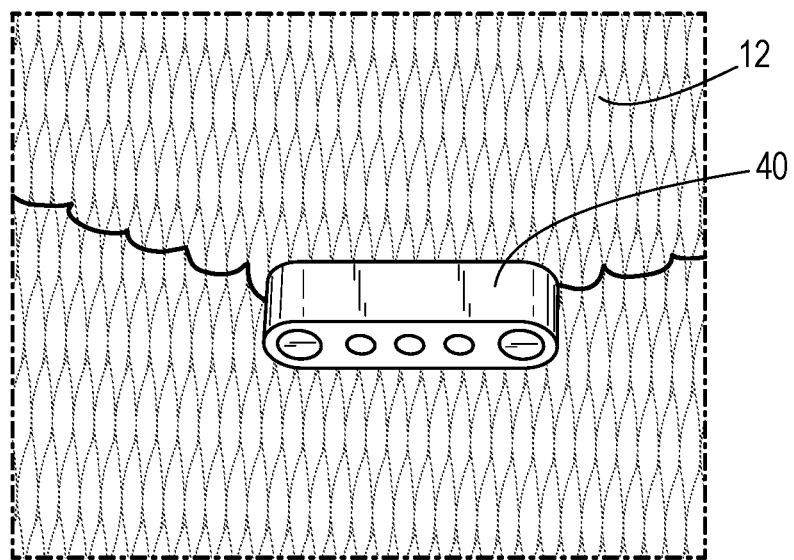
FIG. 7 is a perspective view of the load securing strap with plug.

As shown in FIGS. 1-3, a strap detection system 22 is shown which includes an electric device 24 associated with the strap 12 and a detection module 26. The system 22 electrically detects when the strap 12 is torn or needs replacing.

The electric device 24 preferably includes a conductive pathway 28 positionable or fastened on the strap 12. The electric device 24 can be incorporated or embedded into the strap 12 when the strap 12 is manufactured or the electric device 24 can be positioned on the strap 12 after fabrication such as using a fastener, adhesive or the like. It should be noted that other electric devices 24 such as sensors and wireless transmitters can also be utilized.

Preferably, the conductive pathway 28 is an open loop having a first end 30 and a second end 32. The conductive pathway 28 preferably starts at the first end 30, runs along the second edge 16, arcs and changes direction to run adjacent the fourth edge 20 terminating at the second end 32. The conductive pathway 28 can be positioned approximately 24% from each edge for FMCSA compliance testing, however, other locations and percentages can also be utilized. It should be noted that the conductive pathway 28 can have other configurations and there could be positioned more than one conductive pathway 28 such as from side edge to side edge as well as up the middle of the strap, for example.

Preferably, the conductive pathway 28 is composed of conductive thread such as stainless steel type, available from e-textile suppliers, however, other components to form the conductive pathway 28 can also be utilized such as copper or silver thread and the like. For example, the conductive thread can be 2 ply having a resistivity of 16 ohm/ft or 3 ply having a resistivity of 10 ohm/ft. The conductive pathway 28 when uninterrupted can conduct a current from the first end 30 to the second end 32 and when interrupted cannot conduct current from the first end 30 to the second end 32. The detection module 26 is electrically in communication with the conductive pathway 28 and together they form a circuit 34.

Figure 8:
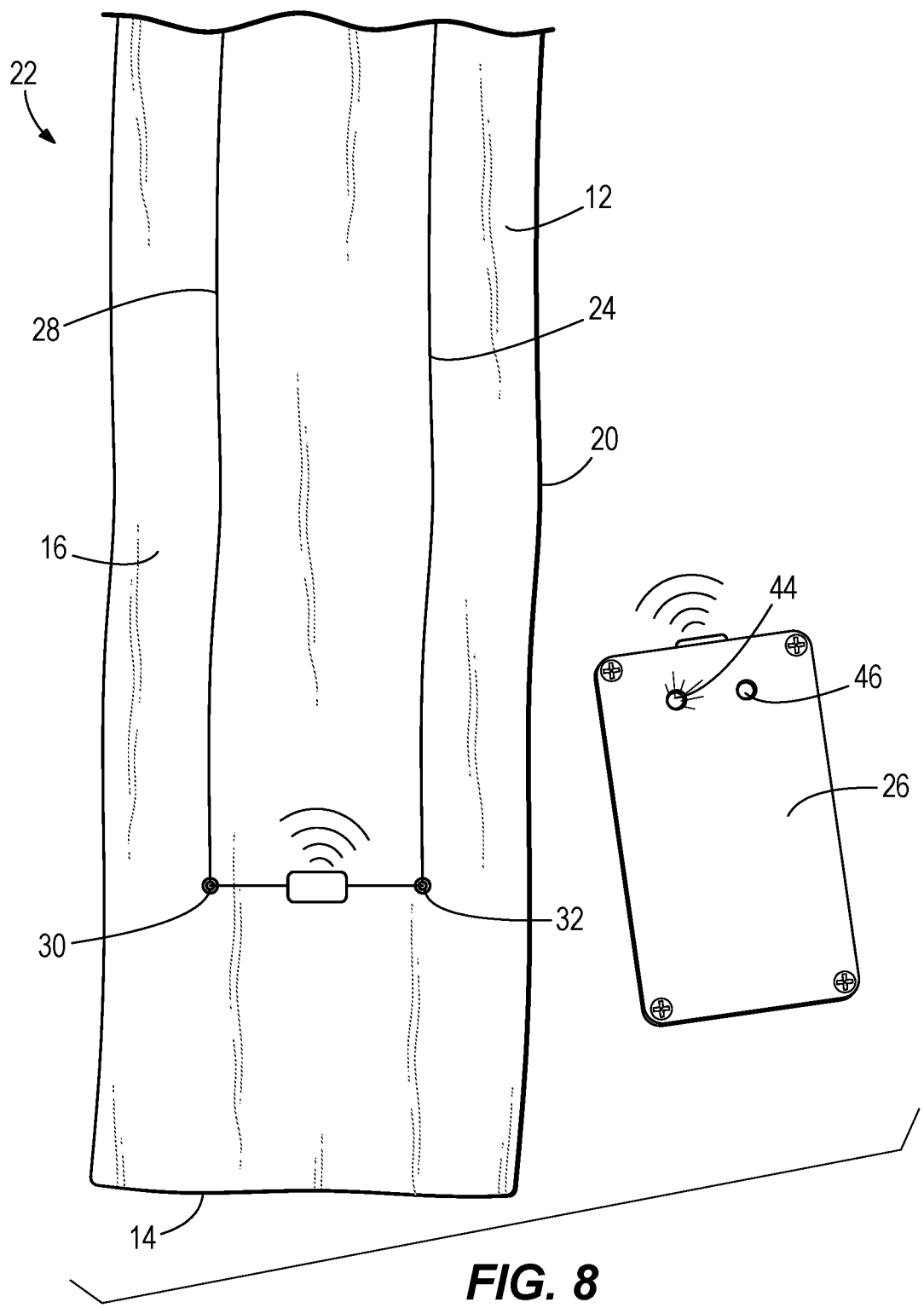
FIG. 8 is a top view of the load securing strap and a third embodiment of the detection module.

In a first embodiment shown in FIG. 3, the detection module 26 connects to the conductive pathway 28 using a first connector 36 that engages the first end 30 and a second connector 38 that engages a second end 32. In a second embodiment shown in FIGS. 4-7, the strap 12 includes a plug 40 connected to the first end 30 and the second end 32 and the detection module 26 includes pins 42 onto which the plug 40 is positioned. In a third embodiment shown in FIG. 8, the conductive pathway 28 and the detection module 26 are in wireless communication as is known in the art.

As shown with all three embodiments in FIGS. 3-8, the detection module 26 includes an indicator 44. The indicator 44 is preferably a visual indicator such as a red light, however, other indicators can also be utilized such as an audio indicator or a display screen. The indicator 44 is activated when the strap 12 is detected to be torn or to be in need of replacement. The detection module 26 can also include a second indicator 46 that is preferably a visual indicator such as a green light, however, other indicators can also be utilized such as an audio indicator. The second indicator 46 is activated when the strap 12 is detected to be not worn or not in need of replacing.

Figure 9:
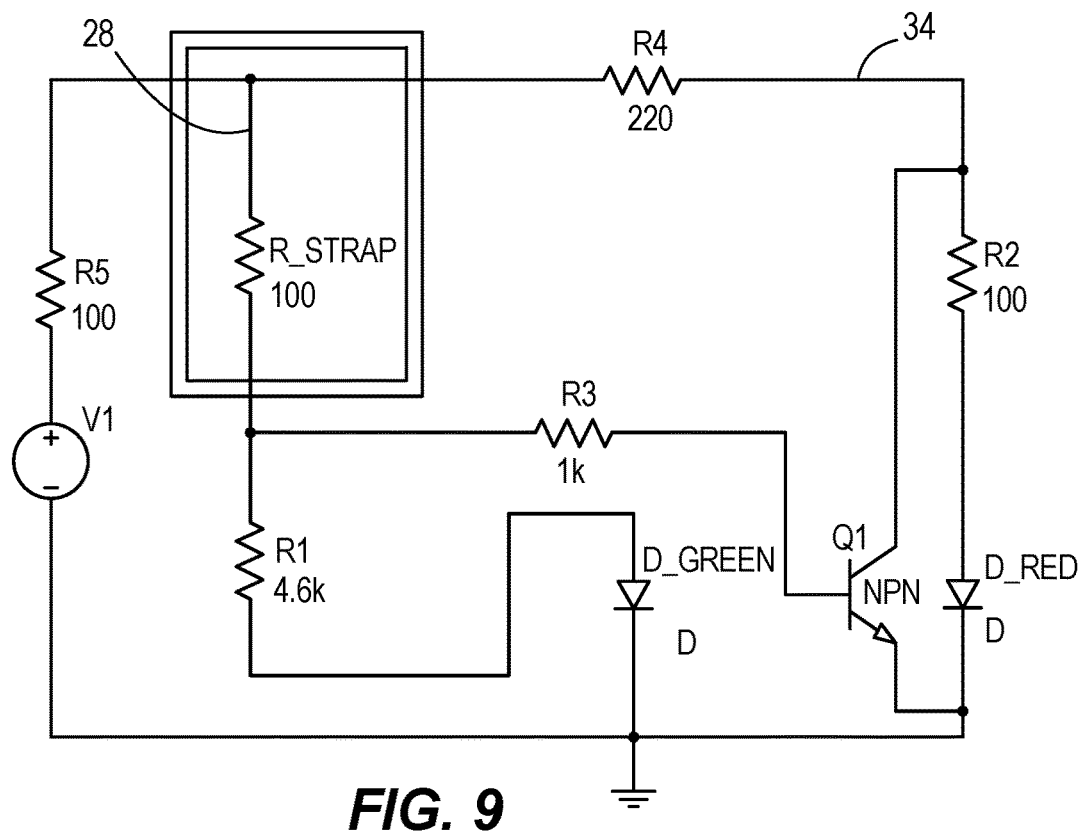
FIG. 9 is a circuit schematic of the detection module.
Figure 10:
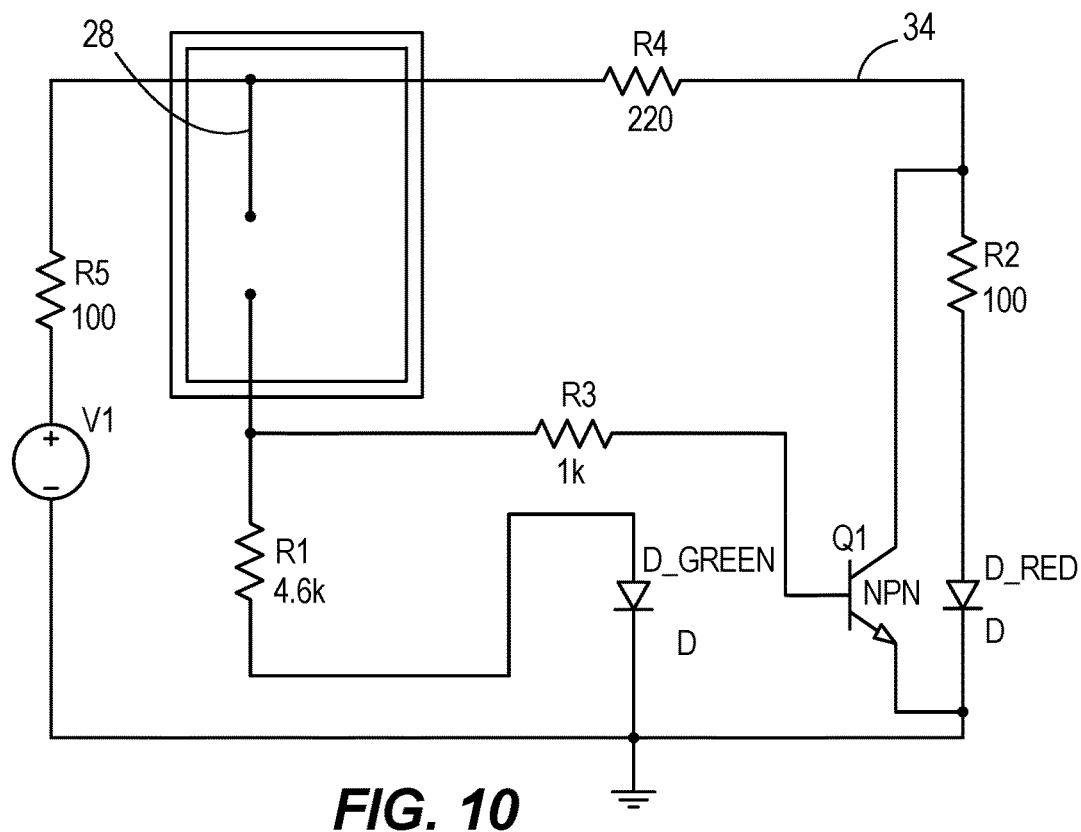
FIG. 10 is a circuit schematic of the detection module.

Turning to FIGS. 9 and 10, the circuit 34 and the components of the detection module 26 are shown. The resistor R STRAP within the box outline represents the intrinsic resistance of the conductive pathway 28 in the strap 12. Resistor R5 is not necessary for functionality of the detection module 26 but can be included to limit the current from the voltage source in case of a short circuit. The detection module 26 measures the conductivity of the conductive pathway 28 by applying a voltage to one end 30 or 32 of the conductive pathway 28 and determining whether current flows through the conductive pathway 28.

FIG. 9 is the complete circuit formed when the conductive pathway 28 is conducting current and is indicative that the strap 12 is not torn or in need of replacement. The second indicator 46 is activated as indicated by the green light.

FIG. 10 shows the open circuit when the conductive pathway 28 is interrupted. Current no longer passes through the conductive pathway 28 and the indicator 44 is activated such as by turning off the indicator 46 and disabling the FET in parallel with the indicator 44 which activates the indicator 44 as indicated by the red light. It should be noted that other types and arrangements of circuitry within the detection module 26 can be utilized as is known by those of skill in the art.

When a user needs to test a strap 12, the detection module 26 is placed in electric communication with the electric device 24 on the strap 12. The detection module 26 supplies a current to the conductive pathway 28. The indicator 44 will be activated if the conductive pathway 28 is interrupted such as if the strap 12 is torn from an edge 14, 16, 18 and 20, is torn internally of an edge 14, 16, 18 and 20 such as in a hole in the middle of the strap 12, is stretched, or is otherwise in need or replacement. It should be noted that the invention can be utilized if the strap 12 is stretched, but not torn, to the point of interrupting the conductive path 28. If stretched beyond a given tolerance or range, the strap 12 may need to be replaced even though it is not torn. If there is a second indicator 46, it will be activated if the strap 12 is operating normally and is not torn, stretched or otherwise in need of replacement.

Various features and advantages of the invention are set forth in the following claims.

What is claimed is:

1. A strap detection system comprising:
   a load securing strap adapted to secure a load to a surface;
   an electrically conductive thread on the strap; and
   a detection module removably attachable to the conductive thread, the detection module including an indicator operatable when the detection module determines the strap has been torn from a prior use.

2. The strap detection system of claim 1 wherein the conductive thread forms a conductive pathway running parallel to at least one edge of the strap.

3. The strap detection system of claim 1 wherein the conductive thread is embedded in the strap.

4. The strap detection system of claim 1 wherein the detection module is removably attachable to the conductive thread with wires.

5. The strap detection system of claim 1 wherein the detection module is removably attachable to the conductive threads with a plug.

6. The strap detection system of claim 1 wherein the indicator is a visual indicator.

7. The strap detection system of claim 1 and further including a second indicator operable when the strap is not torn.

8. A strap detection system comprising:
   a conductive pathway fastenable to a load securing strap that has previously secured a load to a surface; and
   a detection module in selective communication with the conductive pathway for determining when the strap is in need of replacement by detecting an interruption of the conductive pathway due to a tear in the strap.

9. The strap detection system of claim 8 wherein the conductive pathway includes conductive thread.

10. The strap detection system of claim 9 wherein the detection module is in wired temporary communication with the conductive pathway.

11. A load securing strap detection assembly comprising:
    a load securing strap structured to secure a load to a surface and having previously secured a load to a surface, the strap having two edges and having a conductive pathway running adjacent each edge; and
    a detection module selectively attachable to the strap when the strap is to be tested for tears and to be in communication with the conductive pathway and supplying the conductive pathway with current, the detection module having a first visual indicator operable when current is flowing throughout the entire pathway and a second visual indicator operable when current is interrupted in the conductive pathway.

12. The load securing strap assembly of claim 11 wherein the pathway has a first end and a second end, wherein the first end and the second end are in temporary wired communication with the detection module to form a circuit.

13. The load securing strap detection assembly of claim 11 wherein the conductive pathway is positioned 24% inwardly of each edge.

14. A method for detecting if a load securing strap needs to be replaced comprising the steps of:
providing a load securing strap that has previously secured a load to a surface and that has a conductive pathway secured to it to be tested, the strap has a width;
supplying a detection module;
temporarily electrically connecting the detection module to the conductive pathway;
activating an indicator on the detection module if the strap has been torn less than its width; and
disconnecting the detection module from the strap.

15. The method of claim 14 wherein the indicator is a visual indicator.

16. The method of claim 14 wherein the indicator is activated when the strap has been torn more than 24% from an edge.

* * * * *